(12) United States Patent
Chen et al.

(10) Patent No.: US 9,225,250 B2
(45) Date of Patent: Dec. 29, 2015

(54) CONTROL CIRCUIT WITH CURRENT SAMPLING MECHANISM FOR REDUCING CURRENT ERROR OF OUTPUT OF POWER CONVERTER AND CONTROL METHOD THEREOF

(71) Applicant: NATIONAL TAIWAN UNIVERSITY, Taipei (TW)

(72) Inventors: Yaow-Ming Chen, Taipei (TW); Cheng-Nan Wu, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 289 days.

(21) Appl. No.: 13/802,608

(22) Filed: Mar. 13, 2013

(65) Prior Publication Data
US 2014/0177289 A1 Jun. 26, 2014

(30) Foreign Application Priority Data

Dec. 26, 2012 (TW) .............................. 101150172 A

(51) Int. Cl.
*H02M 3/335* (2006.01)
*H02M 1/00* (2007.01)
(52) U.S. Cl.
CPC ...... *H02M 3/33507* (2013.01); *H02M 3/33515* (2013.01); *H02M 2001/0009* (2013.01)
(58) Field of Classification Search
CPC ............ H02M 3/33515; H02M 3/335; H02M 3/33507; H02M 2001/0009
USPC ....................................... 363/20, 21.02–21.18
See application file for complete search history.

(56) References Cited

U.S. PATENT DOCUMENTS

| 2005/0024898 A1* | 2/2005 | Yang et al. ................. 363/21.12 |
| 2006/0133118 A1* | 6/2006 | Yang et al. ................. 363/21.12 |
| 2007/0040516 A1 | 2/2007 | Chen |
| 2009/0310388 A1* | 12/2009 | Yang et al. ................. 363/21.13 |
| 2011/0038183 A1* | 2/2011 | Yang et al. ................. 363/21.17 |
| 2012/0300503 A1* | 11/2012 | Yang et al. ................. 363/21.02 |
| 2012/0300508 A1* | 11/2012 | Fang et al. ................. 363/21.17 |
| 2013/0033905 A1* | 2/2013 | Lin ................... H02M 3/33507 363/21.13 |
| 2014/0078790 A1* | 3/2014 | Lin et al. .................... 363/21.16 |

FOREIGN PATENT DOCUMENTS

| TW | I288313 B | 10/2007 |
| TW | 200951451 A | 12/2009 |
| TW | I343692 B | 6/2011 |
| TW | I353499 B | 12/2011 |

* cited by examiner

*Primary Examiner* — Fred E Finch, III
*Assistant Examiner* — Gustavo Rosario Benitez
(74) *Attorney, Agent, or Firm* — CKC & Partners Co., Ltd.

(57) ABSTRACT

A control circuit adjusts the output of a power converter by controlling a power switch, in which a primary side of a transformer, the power switch and a sensing resistor are connected in series to ground. The control circuit includes a peak current emulating unit, an error amplifier, a comparator, and a control signal generator. The peak current emulating unit samples sampling voltages from the sensing resistor and obtains a real current sensing voltage and an current sensing voltage using the sampling voltages. The error amplifier receives a fixed reference voltage and a DC voltage generated from the output of the power converter, and generates an error signal. The comparator receives the real current sensing voltage and the error signal and generates a transition signal. The control signal generator receives the transition signal and generates a control signal for controlling the power switch.

10 Claims, 9 Drawing Sheets

900

Obtain a plurality of sampling voltages from the sensing resistor at a plurality of sampling times, respectively. — 901

Perform calculations using the sampling voltages to obtain a real sampling voltage and an initial sampling voltage. — 902

Generate an error signal by inputting a fixed reference voltage and a DC voltage generated from the output of the power converter to an error amplifier. — 903

Generate a transition signal by inputting the real sampling voltage and the error signal to a comparator. — 904

Generate a control signal to control the power switch by inputting the transition signal to a control signal generator. — 905

Fig. 9

CONTROL CIRCUIT WITH CURRENT SAMPLING MECHANISM FOR REDUCING CURRENT ERROR OF OUTPUT OF POWER CONVERTER AND CONTROL METHOD THEREOF

RELATED APPLICATIONS

This application claims priority to Taiwanese Application Serial Number 101150172, filed Dec. 26, 2012, which is herein incorporated by reference.

BACKGROUND

1. Field of Invention

The present invention relates to a control circuit and a control method thereof. More particularly, the present invention relates to a control circuit for reducing current error in an output of a power converter and a control method thereof.

2. Description of Related Art

In a conventional switching power supply or a light-emitting diode (LED) driver, if there is no additional control for the output current, it is difficult to achieve a fixed output current within a wide range of input voltage, such as 90~270 AC voltage.

As shown in FIG. 1, in order to reduce the cost of circuitry, a conventional power converter 100 typically uses a primary side 101 of a transformer to control the output current. The inductor current in the primary side 101 is usually compared with an error signal for determining a cut-off point of a power switch 102. However, in practice, an error in the inductor current is caused easily due to the effect of the propagation delay of the circuitry in the power converter 100, thereby resulting in an inaccurate cut-off point of the power switch 102 and a variation in the output voltage and current, ultimately degrading the line regulation of the power converter 100. For example, as shown in FIG. 2, in an inductor current waveform 201, the real peak value of the inductor current should be $I_{peak1}$. However, due to the effect of the propagation delay $T_d$ of the circuitry, the actual peak value becomes $I_{peak}$. Further, when the input voltage increases or there is an error in the amount of the inductance, the inductor current changes to the waveform 202, and thus the real peak current is changed to $I_{peak2}$ from $I_{peak1}$. In each of the waveform 201 and the waveform 202, error caused by the propagation delay $T_d$ varies the output current and degrades the line regulation.

SUMMARY

An aspect of the present invention is to provide a control circuit for controlling an output of a power converter to reduce the error in an output current. A primary side of a transformer of the power converter, a power switch and a sensing resistor are connected in this order and in series to ground. The control circuit includes a peak current emulating unit, an error amplifier and a comparator. The peak current emulating unit is configured for sampling a plurality of sampling voltages from the sensing resistor and then performing calculations using the sampling voltages to obtain a real current sensing voltage and an initial current sensing voltage. The error amplifier is configured for receiving a fixed reference voltage and a DC voltage generated from the output of the power converter and generating an error signal. The comparator is configured for receiving the real current sensing voltage and the error signal and generating a transition signal. The control signal generator is configured for receiving the transition signal and generating a control signal to control the power switch.

According to one embodiment of the present invention, the peak current emulating unit includes a sample and hold circuit and a peak current calculating circuit. The sample and hold circuit is configured for sampling the sampling voltages from the sensing resistor respectively at the plurality of sampling times. The peak current calculating circuit is configured for receiving the sampling voltages from the sample and hold circuit, and generating the real current sensing voltage and the initial current sensing voltage using the sampling voltages.

According one embodiment of the present invention, the sampling times include a first sampling time, a second sampling time, a third sampling time and a fourth sampling time; the sampling voltages corresponding respectively to the sampling times include a first sampling voltage, a second sampling voltage, a third sampling voltage and a fourth sampling voltage; the fourth sampling time is the time when the power switch turns off; and the time interval between the first sampling time and the second sampling time is the same as a propagation delay time of the power converter.

Another aspect of the present invention is to provide a control method for controlling an output of a power converter by a power switch. A primary side of a transformer of the power converter, the power switch and a sensing resistor are connected in this order and in series to ground. The control method includes the steps outlined below. Pluralities of sampling voltages are obtained from the sensing resistor at a plurality of sampling times, respectively. Calculations are performed using the sampling voltages to obtain a real current sensing voltage and an initial current sensing voltage. A fixed reference voltage and a DC voltage generated from the output of the power converter are input to an error amplifier for generating an error signal. The real current sensing voltage and the error signal are input to a comparator for generating a transition signal. The transition signal is input to a control signal generator for generating a control signal to control the power switch.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIG. 9 is a flow chart of a control method according to one embodiment of the present invention.

DETAILED DESCRIPTION

Figure 1:
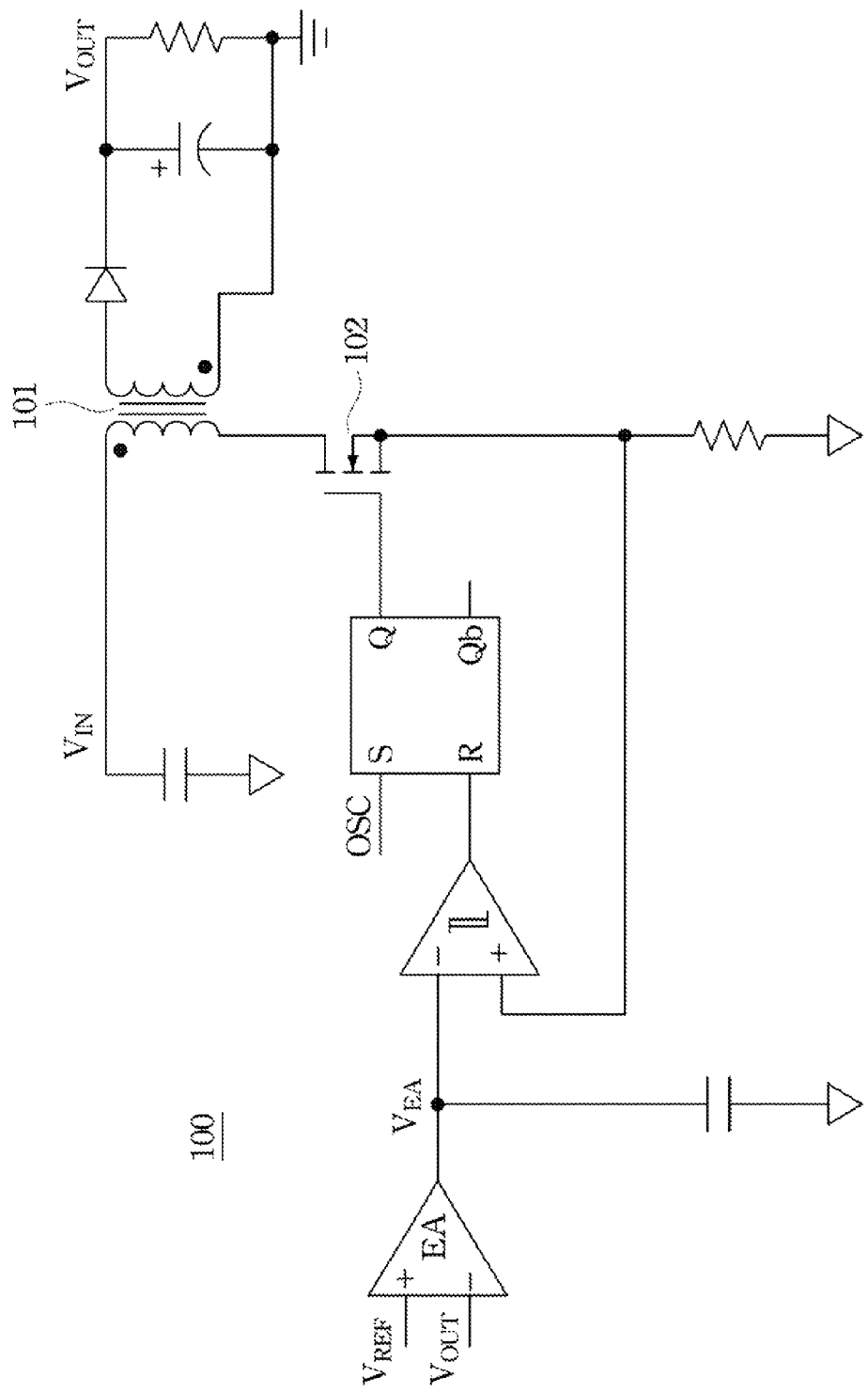
FIG. 1 is a schematic circuit diagram of a conventional power converter.
Figure 2:
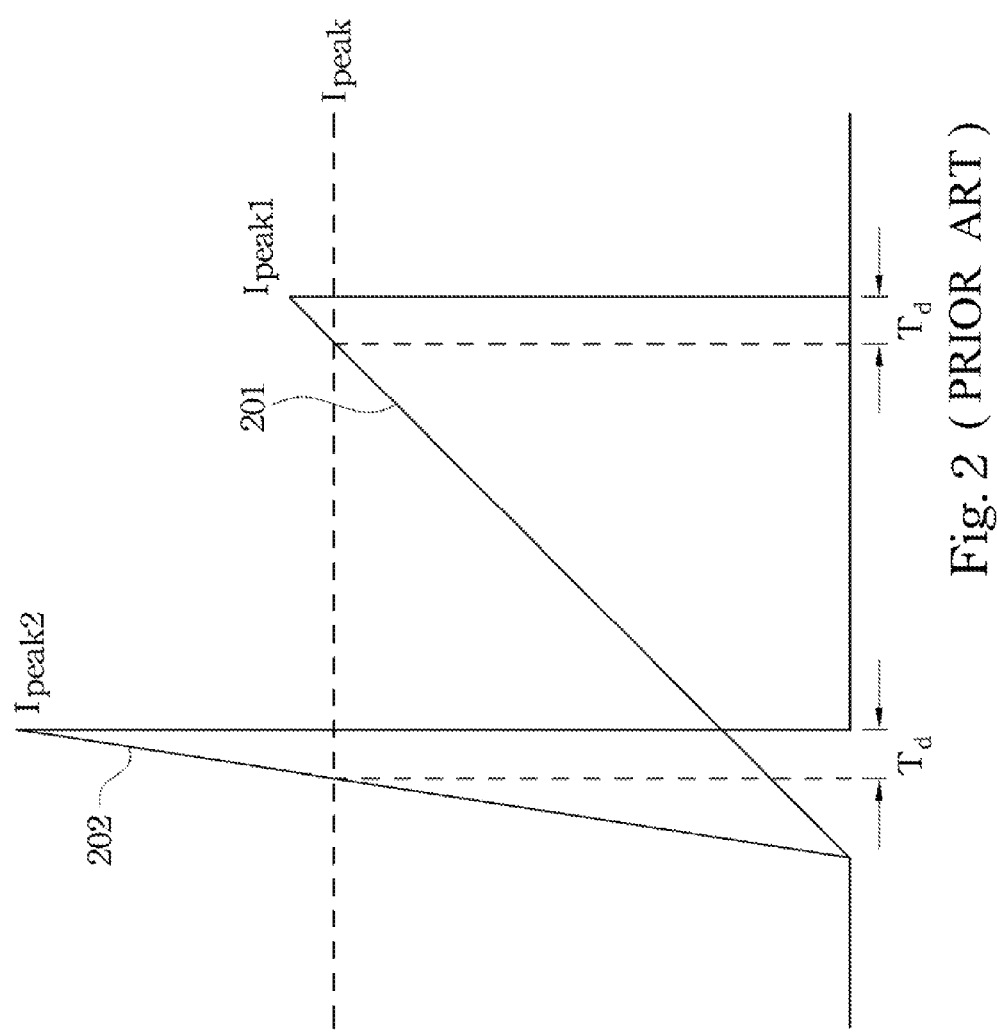
FIG. 2 is a graph of waveforms of inductor current affected by propagation delay in the conventional power converter.

Reference will now be made in detail to the present embodiments of the invention, examples of which are illustrated in the accompanying drawings. Wherever possible, the same reference numbers are used in the drawings and the description to refer to the same or like parts.

Figure 3:
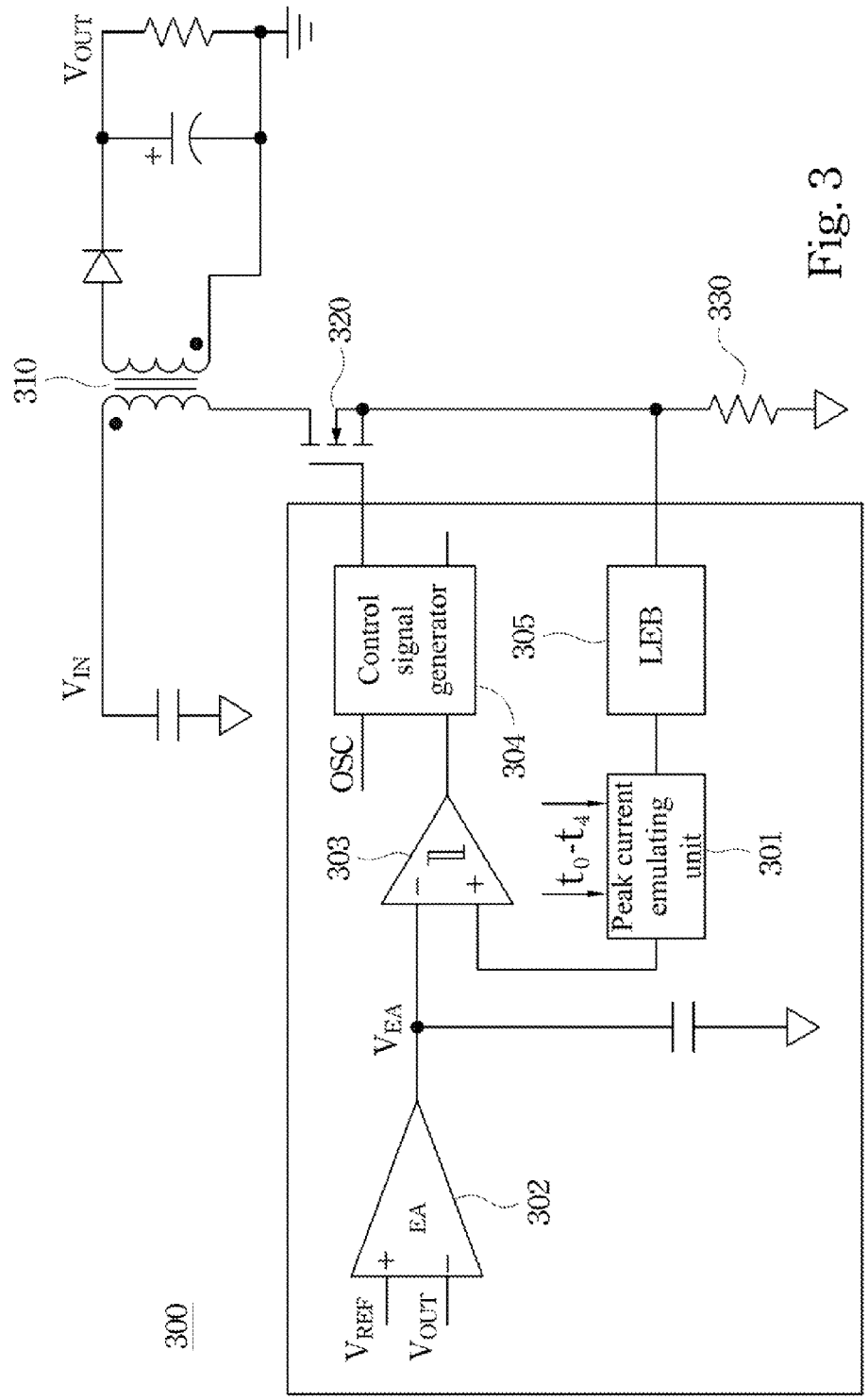
FIG. 3 is a schematic circuit diagram of a control circuit according to one embodiment of the present invention.

FIG. 3 is a schematic circuit diagram of a control circuit according to one embodiment of the present invention. As shown in FIG. 3, a primary side of a transformer 310, a power switch 320 and a sensing resistor 330 are connected in this order and in series to ground. The control circuit 300 adjusts the output of the circuitry in FIG. 3 by controlling the power switch 320. The circuitry in FIG. 3, which is a power converter, can be operated in a continuous conduction mode, a discontinuous conduction mode, a critical mode or a mixed mode. The control circuit 300 includes a peak current emulating unit 301, an error amplifier 302, a comparator 303 and a control signal generator 304. One end of the peak current emulating unit 301 is coupled to the comparator 303, and the other end of the peak current emulating unit 301 is coupled to the sensing resistor 330 for sampling a plurality of sampling voltages from the sensing resistor 330. The peak current emulating unit 301 is configured for performing calculations on sampling voltages to obtain a real current sensing voltage and an initial current sensing voltage. One of the inputs of the error amplifier 302 is configured for receiving a fixed reference voltage, and the other one of the inputs of the error amplifier 302 is configured for receiving a DC voltage generated from the output of the overall circuitry. The error amplifier 302 is configured for generating an error signal. The comparator 303 has two inputs that are configured for receiving the real current sensing voltage and the error signal respectively. The comparator 303 generates a transition signal after comparing the real current sensing voltage with the error signal. The control signal generator 304 is configured for receiving the transition signal and then generating a corresponding control signal to control the power switch 320. In this way, the line regulation of the overall circuitry can be improved by the real current sensing voltage, which is calculated from the sampling voltages by the peak current emulating unit 301.

Figure 4:
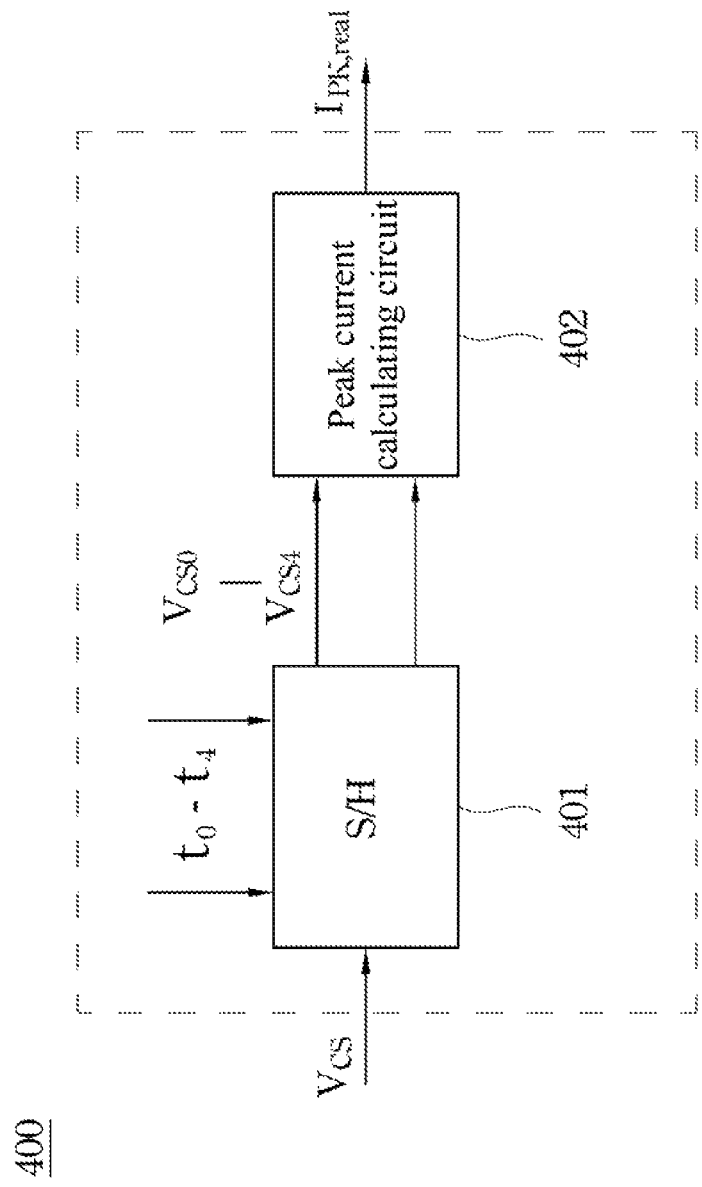
FIG. 4 is a block diagram of a peak current emulating unit according to one embodiment of the present invention.

FIG. 4 is a block diagram of a peak current emulating unit according to one embodiment of the present invention. As shown in FIG. 4, the peak current emulating unit 400 includes a sample and hold circuit 401 and a peak current calculating circuit 402. With additional reference to FIG. 3, the sample and hold circuit 401 is coupled to the sensing resistor 330, and the sample and hold circuit 401 is configured for sampling the sampling voltages from the sensing resistor 330 at a plurality of sampling times. The peak current calculating circuit 402 is coupled to the sample and hold circuit 401, and is configured for receiving the sampling voltages from the sample and hold circuit 401 and performing calculations using the sampling voltages to generate the real current sensing voltage and the initial current sensing voltage. In this way, the aforementioned operation of sampling can be achieved by the sample and hold circuit 401, and variations in the output current can be reduced by a precise peak current calculated by the peak current calculating circuit 402.

Figure 5:
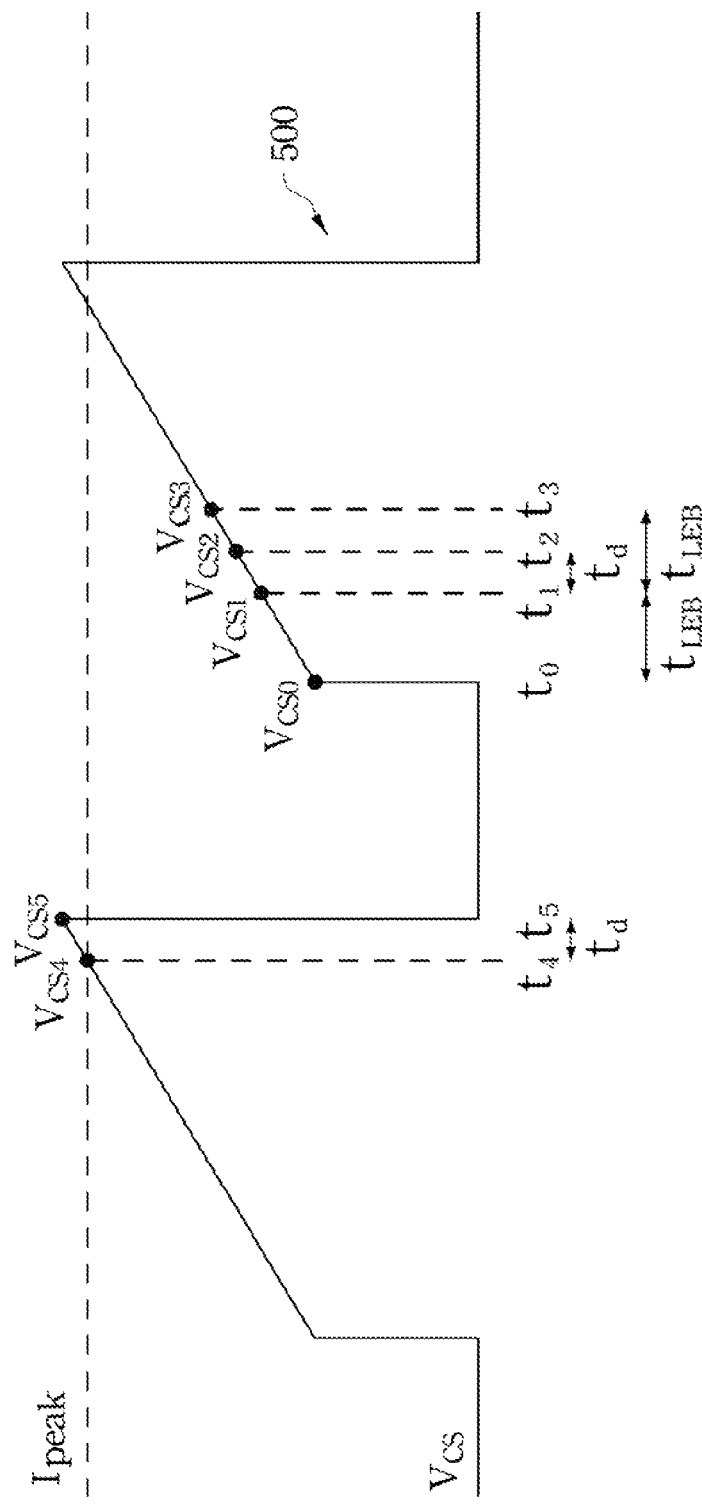
FIG. 5 is a timing diagram of sampling times according to one embodiment of the present invention.

FIG. 5 is a timing diagram of sampling times according to one embodiment of the present invention. In the timing diagram of sampling times as they relate to inductor current 500, a plurality of sampling times include a first sampling time $t_1$, a second sampling time $t_2$, a third sampling time $t_3$ and a fourth sampling time $t_4$, in which the fourth sampling time $t_4$ is the time when the power switch is turned off. The corresponding sampling voltages include a first sampling voltage $V_{cs1}$, a second sampling voltage $V_{cs2}$, a third sampling voltage $V_{cs3}$ and a fourth sampling voltage $V_{cs4}$. Moreover, the time interval between the first sampling time $t_1$ and the second sampling time $t_2$ is the same as a propagation delay time $t_d$ in the circuitry of the power converter, that is $t_2 - t = t_d$.

However, the time $t_5$ in FIG. 5 is the time when the real peak current occurs. With respect to the timing diagram of actual circuitry, the real peak current sensing voltage (i.e., the real peak current $I_{pk,real}$), which corresponds to the time $t_5$, cannot be directly obtained due to the fact that the time $t_5$ is the time after the power switch turns off. The corresponding real current sensing voltage is $V_{cs5}$.

Hence, the peak current calculating circuit 402 calculates the aforementioned real current sensing voltage $V_{cs5}$ in accordance with the aforementioned configuration of the sampling times. That is, the peak current calculating circuit 402 generates the real current sensing voltage $V_{cs5}$ by adding the fourth sampling voltage $V_{cs4}$ and the second sampling voltage $V_{cs2}$ and subtracting the first sampling voltage $V_{cs1}$, that is $V_{cs5} = V_{cs4} + V_{cs2} - V_{cs1}$. In this way, the error in output current can be reduced by obtaining the real peak current through an additional calculation that utilizes the linearity of the inductor current.

In one embodiment of the present invention, the circuitry in FIG. 3 is operated in the mixed mode. In an ideal situation, an initial current sensing voltage would be measured from the sensing resistor 330 at the time when the power switch 320 turns on, so that it can be determined whether the current circuitry is operating in the continuous conduction mode or the discontinuous conduction mode. However, in actual circuitry, the precise initial current sensing voltage cannot be directly measured due to the fact that the sampling voltage measured at the time when the power switch 320 turns on is usually accompanied with spikes and ringing, which distorts the sampling voltage. Hence, the circuitry in FIG. 3 further includes a leading edge blanking unit 305, which is configured for delaying the sample and hold circuit 302 for a leading edge blanking time $t_{LEB}$ before sampling each of the sampling voltages from the sensing resistor.

Furthermore, the time $t_0$ in FIG. 5 is the time when the power switch 320 turns on, and the corresponding initial voltage is denoted as $V_{cs0}$. Moreover, the sampling times are such that the time interval between the first sampling time $t_1$ and the third sampling time $t_3$ and the time interval between the first sampling time $t_1$ and the time $t_0$ when the power switch 320 turns on are the same as the leading edge blanking time $t_{LEB}$, that is $t_{LEB} = t_3 - t_1 = t_1 - t_0$.

Therefore, the peak current calculating circuit 402 (see FIG. 4) generates the initial current sensing voltage $V_{cs0}$ by subtracting the third sampling voltage $V_{cs3}$ from a product of two times the first sampling voltage $V_{cs1}$, that is $V_{cs0} = 2V_{cs1} - V_{cs3}$. In this way, the operation mode in the current circuitry can be determined by a precise initial current sensing voltage obtained from an additional calculation that utilizes the linearity of the inductor current.

Figure 6:
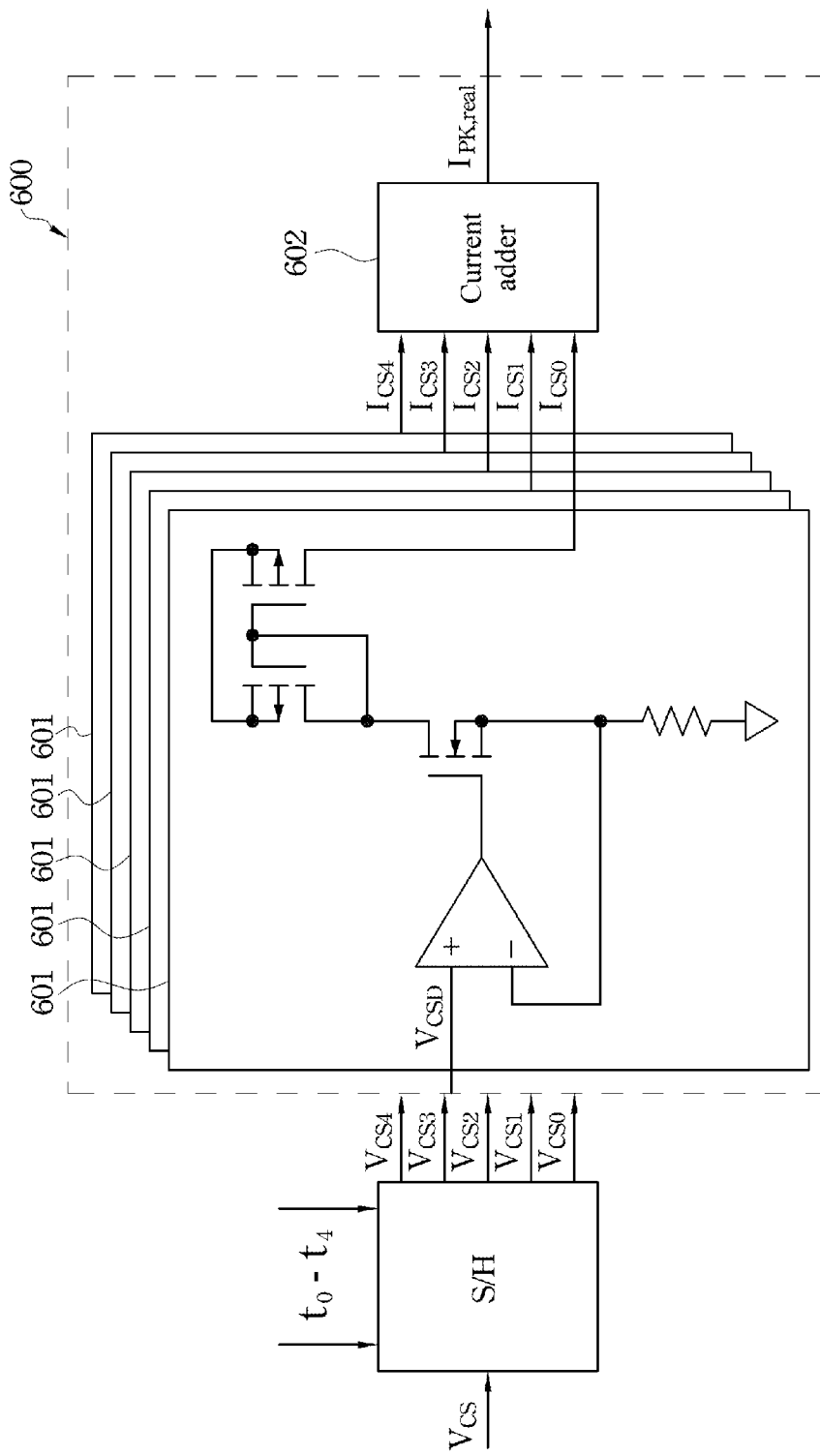
FIG. 6 is a schematic circuit diagram of a peak current calculating circuit according to one embodiment of the present invention.

FIG. 6 is a schematic circuit diagram of the peak current calculating circuit according to one embodiment of the present invention. The peak current calculating circuit can be implemented by an analog circuit. For example, as shown in FIG. 6, the peak current calculating circuit 600 includes a plurality of current mirrors 601 and a current adder 602. To simplify illustration, FIG. 6 shows only one of the current mirrors 601. The current mirrors 601 are configured for receiving the sampling voltages, respectively, and converting the sampling voltages into a plurality of corresponding sampling currents. The current adder 602 is configured for receiving the sampling currents and performing the aforementioned calculation to generate the real current sensing voltage $V_{cs5}$ and the initial current sensing voltage $V_{cs0}$.

Figure 7:
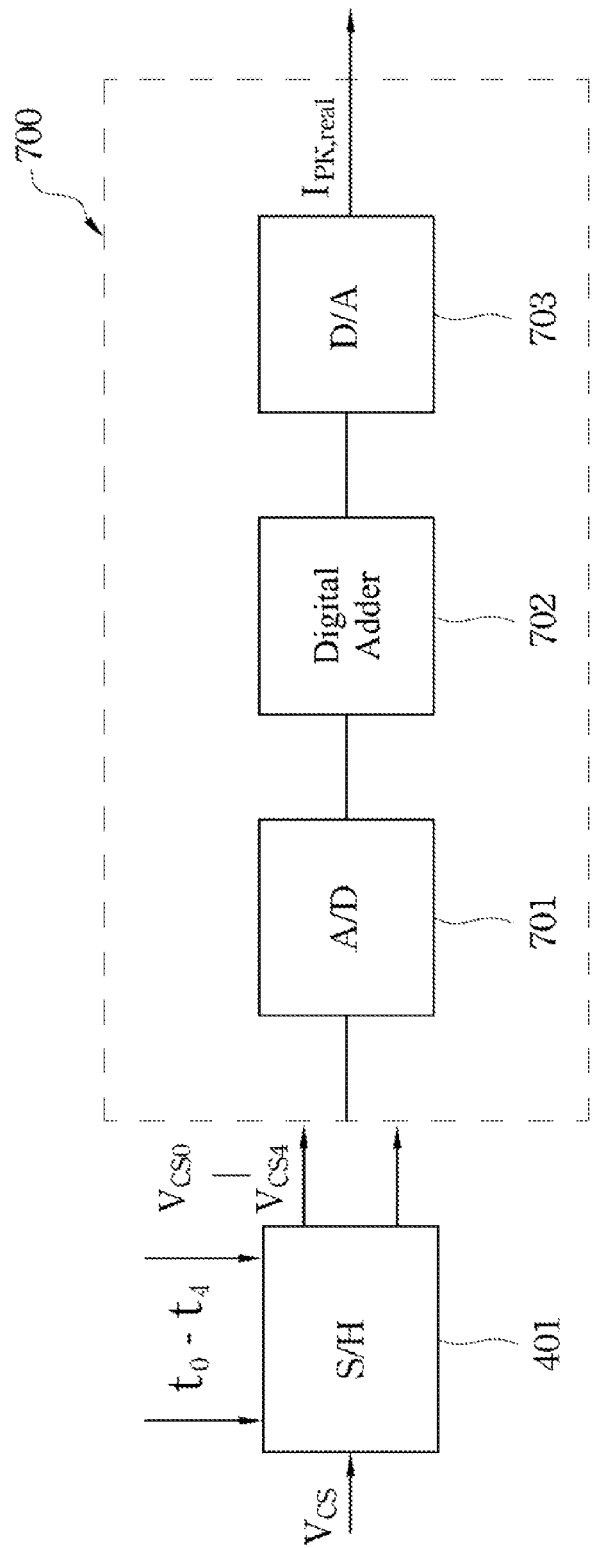
FIG. 7 is a block diagram of the peak current calculating circuit according to another embodiment of the present invention.

FIG. 7 is a block diagram of the peak current calculating circuit according to another embodiment of the present invention. The aforementioned peak current calculating circuit can be implemented also by a digital circuit. As shown in FIG. 7, the peak current calculating circuit 700 includes an analog-to-digital converter (ADC) 701, a digital adder 702 and a digital-to-analog converter (DAC) 703. The ADC 701 receives the sampling voltages, and then the ADC 701 converts the sampling voltages into a plurality corresponding digital codes and transmits the digital codes to the digital adder 702. After receiving and performing calculations using the digital codes, the digital adder 702 generates a digital signal and transmits the same to the DAC 703. The DAC 703 receives the digital signal and converts the digital signal into the real current sensing voltage $V_{cs5}$ and the initial current sensing voltage $V_{cs0}$.

Figure 8:
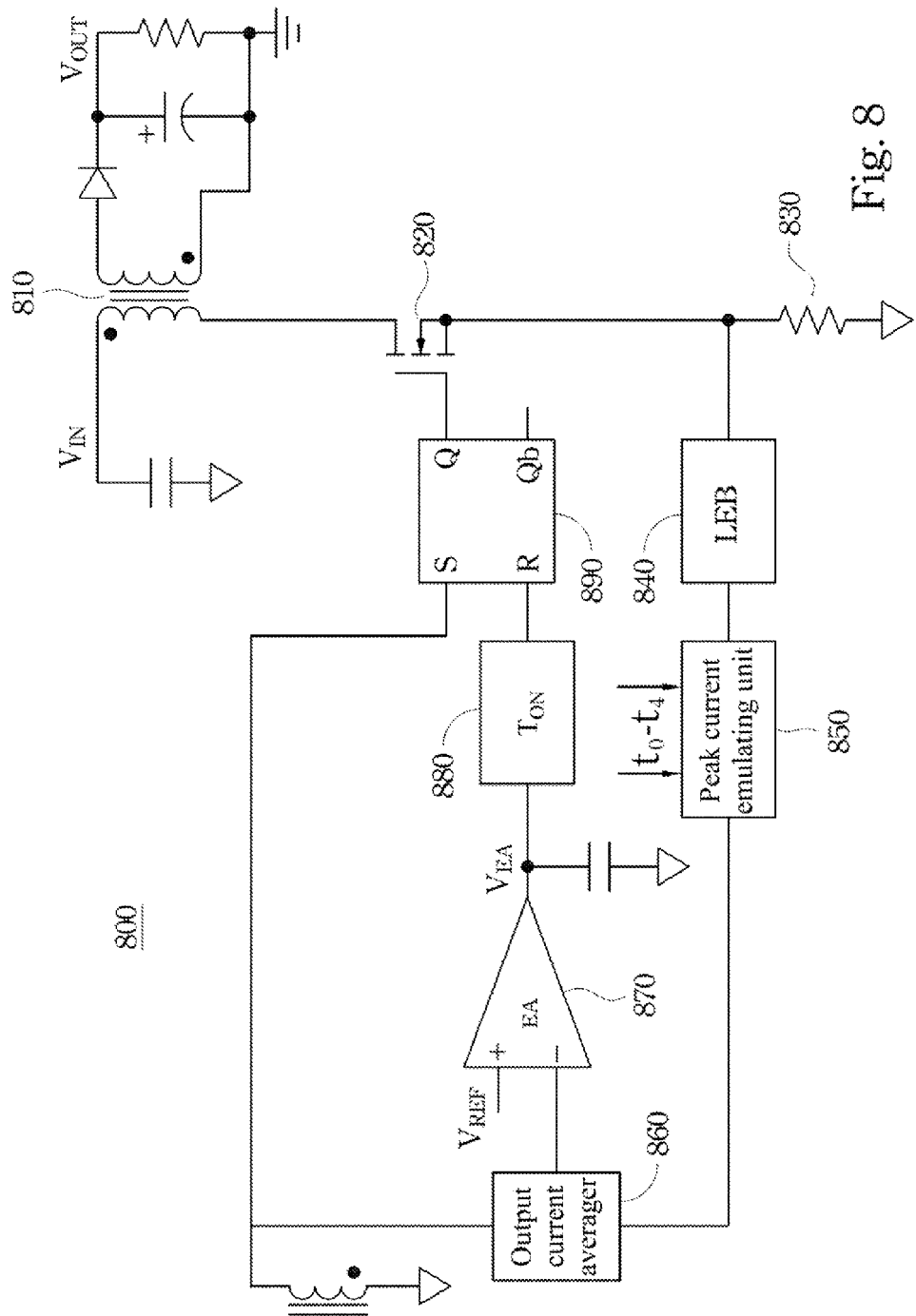
FIG. 8 is a schematic circuit diagram of an LED driver according to another embodiment of the present invention.

Further, in practice, as a LED driver needs a stable current output, the control circuit 300 in FIG. 3 can be applied in the LED driver. FIG. 8 is a schematic circuit diagram of the LED driver according to another embodiment of the present invention. As shown in FIG. 8, a primary side of a transformer 810, a power switch 820 and a sensing resistor 830 are connected in this order and in series to ground, and the LED driver 800 adjusts the output current of the transformer 810 by controlling the power switch 820. The LED driver 800 includes a leading edge blanking unit 840, a peak current emulating unit 850, an output current averager 860, an error amplifier 870, an on-time controller 880 and an RS flip-flop 890. The leading edge blanking unit 840 is configured for delaying the peak current emulating unit 850 for a leading blank time. After the leading blank time, the peak current emulating unit 850 samples a plurality of sampling voltages from the sensing resistor 830 and performs the aforementioned calculation to generate the real current sensing voltage and the initial current sensing voltage and transmits the same to the output current averager 860. After receiving the real current sensing voltage and the initial current sensing voltage, the output current averager 860 performs zero current detection in accordance with the initial current sensing voltage, generates a corresponding control signal, and transmits the control signal to the RS flip-flop 890.

At the same time, the output current averager 860 compares the real current sensing voltage with the initial current sensing voltage to generate a comparison signal, and outputs the comparison signal to the error amplifier 870. One of the inputs of the error amplifier 870 is configured for receiving a fixed reference voltage, and the other one of the inputs of the error amplifier 870 is configured for receiving the comparison signal generated by the output current averager 860. The error amplifier 870 generates an error signal using these inputs, and outputs the error signal to the on-time controller 880. The on-time controller 880 receives the error signal and adjusts the turn-on time of the RS flip-flop 890, and thus adjusts the turn-on time of the power switch 820 to control the output current of the LED driver 800.

FIG. 9 is a flow chart of a control method according to one embodiment of the present invention. The control method 900 involves controlling an output of a power converter by a power switch, in which a primary side of a transformer of the power converter, the power switch and a sensing resistor are connected in this order and in series to ground.

At step 901 of the control method 900, a plurality of sampling voltages are obtained from the sensing resistor at a plurality of sampling times by a sample and hold circuit. The sampling times include a first sampling time $t_1$, a second sampling time $t_2$, a third sampling time $t_3$, and a fourth sampling time $t_4$, in which the fourth sampling time $t_4$ is the time when the power switch turns off. The corresponding sampling voltages include a first sampling voltage $V_{cs1}$, a second sampling voltage $V_{cs2}$, a third sampling voltage $V_{cs3}$, and a fourth sampling voltage $V_{cs4}$. Further, the time interval between the first sampling time $t_1$ and the second sampling time $t_2$ is the same as the propagation delay time $T_d$, that is $t_2-t_1=t_d$.

At step 902 of the control method 900, calculations are performed using the sampling voltages to obtain a real current sensing voltage and an initial current sensing voltage. At step 903 of the control method 900, a fixed reference voltage and a DC voltage generated from the output of the power converter are input to an error amplifier for generating an error signal. At step 904, the real current sensing voltage and the error signal are input to a comparator for generating a transition signal. At step 905, the transition signal is input to a control signal generator for generating a control signal to control the power switch.

In the aforementioned step 902, the real current sensing voltage, which is denoted as $V_{cs5}$, is obtained by adding the fourth sampling voltage $V_{cs4}$ and the second sampling voltage $V_{cs2}$ and subtracting the first sampling voltage $V_{cs1}$, that is $V_{cs5}=V_{cs4}+V_{cs2}-V_{cs1}$.

In the aforementioned step 901, the sample and hold circuit is delayed for a leading edge blanking time $t_{LEB}$ before obtaining the sampling voltages from the sensing resistor at the sampling times, respectively. In this way, distortion of the sampling voltages caused by spikes and ringing can be avoided. Further, the sampling times in step 901 are such that the time interval between the first sampling time $t_1$ and the third sampling time $t_3$ and the time interval between the first sampling time $t_1$ and the time when the power switch turns on are the same as the leading edge blanking time $t_{LEB}$, that is $t_{LEB}=t_3-t_1=t_1-t_0$.

When the power converter is operated in the mixed mode, the calculation of the aforementioned step 902 further includes subtracting the third sampling voltage $V_{s3}$ from a product of two times the first sampling voltage $V_{s1}$ to obtain the initial current sensing voltage $V_{s0}$, that is $V_{cs0}=2V_{cs1}-V_{cs3}$. In this way, a precise initial current sensing voltage may be obtained utilizing the linearity of the inductor current to determine what mode the current circuitry is being operated in.

Hence, this disclosure provides a control circuit and a control method thereof to correct errors in the inductor current caused by propagation delay in the circuitry of the power converter, and thus errors in the output current of the power converter are reduced and the line regulation is improved.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A control circuit for controlling an output of a power converter by a power switch, wherein a primary side of a transformer of the power converter, the power switch and a sensing resistor are connected in this order and in series to ground, the control circuit comprising:
   a peak current emulating unit for sampling a plurality of sampling voltages from the sensing resistor and then performing calculations using the sampling voltages and a linearity of a current through the sensing resistor, so as to obtain a real current sensing voltage and an initial current sensing voltage;
   an error amplifier for receiving a fixed reference voltage and a DC voltage generated from the output of the power converter and generating an error signal;
   a comparator for receiving the real current sensing voltage and the error signal and generating a transition signal; and
   a control signal generator for receiving the transition signal and generating a control signal to control the power switch,
   wherein the peak current emulating unit comprises:
   a sample and hold circuit for sampling the sampling voltages from the sensing resistor respectively at the plurality of sampling times; and
   a peak current calculating circuit for receiving the sampling voltages from the sample and hold circuit, and generating the real current sensing voltage and the initial current sensing voltage using the sampling voltages,
   wherein the sampling times comprise a first sampling time, a second sampling time, a third sampling time and a fourth sampling time; the sampling voltages corresponding respectively to the sampling times comprise a first sampling voltage, a second sampling voltage, a third sampling voltage and a fourth sampling voltage; the fourth sampling time is the time when the power switch turns off; and the time interval between the first sampling time and the second sampling time is the same as a propagation delay time of the power converter,
   wherein the peak current calculating circuit generates the real current sensing voltage by adding the fourth sampling voltage and the second sampling voltage and subtracting the first sampling voltage.

2. The control circuit of claim 1, wherein the control circuit further comprises a leading edge blanking unit coupled to the sensing resistor and the sample and hold circuit for delaying the sample and hold circuit for a leading edge blanking time before sampling the sampling voltages from the sensing resistor at the sampling times, respectively.

3. The control circuit of claim 2, wherein the sampling times are set such that the time interval between the first sampling time and the third sampling time and the time interval between the first sampling time and the time when the power switch turns on are the same as the leading edge blanking time.

4. The control circuit of claim 3, wherein the peak current calculating circuit generates the initial current sensing voltage by subtracting the third sampling voltage from a product of two times the first sampling voltage.

5. The control circuit of claim 1, wherein the peak current calculating circuit comprises:
   a plurality of current mirrors for receiving the sampling voltages, respectively, and converting the sampling voltages into a plurality of corresponding sampling currents; and
   a current adder for receiving the sampling currents to generate the real current sensing voltage and the initial current sensing voltage.

6. The control circuit of claim 1, wherein the peak current calculating circuit comprises:
   an analog-to-digital converter for receiving the sampling voltages and converting the sampling voltages into a plurality of corresponding digital codes;
   a digital adder for receiving the digital codes and generating a digital signal; and
   a digital-to-analog converter for receiving the digital signal and converting the digital signal into the real current sensing voltage and the initial current sensing voltage.

7. A control method for controlling an output of a power converter by a power switch, wherein a primary side of a transformer of the power converter, the power switch and a sensing resistor are connected in this order and in series to ground, the control method comprising:
   (a) obtaining a plurality of sampling voltages from the sensing resistor at a plurality of sampling times, respectively;
   (b) performing calculations using the sampling voltages a linearity of a current through the sensing resistor, so as to obtain a real current sensing voltage and an initial current sensing voltage;
   (c) generating an error signal by inputting a fixed reference voltage and a DC voltage generated from the output of the power converter to an error amplifier;
   (d) generating a transition signal by inputting the real current sensing voltage and the error signal to a comparator; and
   (e) generating a control signal to control the power switch by inputting the transition signal to a control signal generator,
   wherein the sampling times of step (a) comprise a first sampling time, a second sampling time, a third sampling time and a fourth sampling time; the sampling voltages corresponding respectively to the sampling times comprise a first sampling voltage, a second sampling voltage, a third sampling voltage and a fourth sampling voltage; the fourth sampling time is the time when the power switch turns off; and the time interval between the first sampling time and the second time is the same as a propagation delay time of the power converter,
   wherein step (b) is performed by adding the fourth sampling voltage and the second sampling voltage and subtracting the first sampling voltage to obtain the real current sensing voltage.

8. The control method of claim 7, wherein step (a) comprises:
   delaying a leading edge blanking time before obtaining the sampling voltages from the sensing resistor at the sampling times, respectively.

9. The control method of claim 8, wherein the sampling times of step (a) are set such that the time interval between the first sampling time and the third sampling time and the time interval between the first sampling time and the time when the power switch turns on are the same as the leading edge blanking time.

10. The control method of claim 8, wherein step (b) is performed by subtracting the third sampling voltage from a product of two times the first sampling voltage to obtain the initial current sensing voltage.

* * * * *